(12) United States Patent
Miyazaki et al.

(10) Patent No.: US 8,384,353 B2
(45) Date of Patent: Feb. 26, 2013

(54) BATTERY PACK

(75) Inventors: Hiroshi Miyazaki, Hikone (JP);
Masaaki Sakaue, Hikone (JP)

(73) Assignee: Panasonic Electric Works Power Tools Co., Ltd., Hikone, Shiga (JP)

( * ) Notice: Subject to any disclaimer, the term of this patent is extended or adjusted under 35 U.S.C. 154(b) by 264 days.

(21) Appl. No.: 12/662,462

(22) Filed: Apr. 19, 2010

(65) Prior Publication Data

US 2010/0270973 A1 Oct. 28, 2010

(30) Foreign Application Priority Data

Apr. 24, 2009 (JP) ................... 2009-107036

(51) Int. Cl.
*H02J 7/00* (2006.01)
*H02J 7/04* (2006.01)
(52) U.S. Cl. ......... 320/120; 320/134; 320/136; 320/150
(58) Field of Classification Search ................. 320/120, 320/134, 136
See application file for complete search history.

(56) References Cited

U.S. PATENT DOCUMENTS

| | | | |
|---|---|---|---|
| 4,065,712 A | 12/1977 | Godard et al. | |
| 4,209,736 A | 6/1980 | Reidenbach | |
| 4,426,612 A | 1/1984 | Wicnienski et al. | |
| 4,433,278 A * | 2/1984 | Lowndes et al. | 320/116 |
| 4,829,226 A * | 5/1989 | Nakamura et al. | 320/112 |
| 5,563,496 A * | 10/1996 | McClure | 320/128 |
| 5,936,317 A * | 8/1999 | Sasanouchi et al. | 307/10.7 |
| 6,140,802 A * | 10/2000 | Lundell et al. | 320/136 |
| 7,659,692 B2 * | 2/2010 | Sainomoto et al. | 320/112 |
| 2001/0017531 A1 | 8/2001 | Sakakibara et al. | |
| 2007/0108940 A1 * | 5/2007 | Sainomoto et al. | 320/112 |
| 2008/0211457 A1 | 9/2008 | Rudorff et al. | |
| 2009/0072791 A1 | 3/2009 | Morita et al. | |

FOREIGN PATENT DOCUMENTS

| | | |
|---|---|---|
| JP | 10-12283 | 1/1998 |
| JP | 2007-143284 | 6/2007 |

OTHER PUBLICATIONS

Search Report issued on Nov. 26, 2012 in corresponding European application No. 10 00 4255.

* cited by examiner

*Primary Examiner* — M'Baye Diao
(74) *Attorney, Agent, or Firm* — Bacon & Thomas, PLLC

(57) ABSTRACT

A battery pack which is detachably connected to a charger and charged by connecting thereto, includes a battery assembly including a plurality of secondary batteries serially connected; a pair of power terminals connected to a negative and a positive electrode of the battery assembly, respectively; a control circuit adapted to individually detect voltages across respective secondary batteries and output a charge control signal to the charger when the detected voltages exceed a predetermined value; a signal terminal adapted to output the charge control signal to the charger; and a temperature measurement element for detecting a temperature of the battery assembly. Further, the control circuit changes the predetermined value to be compared with the detected voltages based on the detected temperature of the temperature measurement element.

6 Claims, 6 Drawing Sheets

BATTERY PACK

FIELD OF THE INVENTION

The present invention relates to a battery pack.

BACKGROUND OF THE INVENTION

In an electric power tool, there is used a secondary battery in view of portability and usability. In recent years, a nickel-cadmium or nickel-hydride battery is being replaced with a lithium-ion battery of lighter weight and higher capacity. However, the lithium-ion battery has a drawback, that is, a low tolerance for overcharging or overdischarging when compared to the nickel-cadmium or nickel-hydride battery.

For that reason, for a battery pack including a battery assembly in which a plurality of lithium-ion batteries is serially connected and received within a housing, there has been employed various apparatuses for each lithium-ion battery not to be overcharged or overdischarged.

FIG. 6 illustrates a schematic circuit configuration of a conventional battery pack 1 and a charger 2 disclosed in Japanese Patent Application Publication No. 2007-143284. Referring FIG. 6, schematic description will be made on the conventional example below.

The battery pack 1 is detachably connected to the charger 2 and charged. Further, the battery pack 1 is detachably installed in an electric power tool and supplies electric power thereto. As shown in FIG. 6, the battery pack 1 includes a battery assembly 4 having a plurality of, e.g., four secondary batteries 4A, 4B, 4C and 4D serially connected to each other; a pair of power terminals 5a and 5b connected to a positive and a negative terminal of the battery assembly 4, respectively; a first control circuit 7 for individually detecting voltages V1 to V4 across the secondary batteries 4A to 4D and, when at least one of the detected voltages V1 to V4 exceeds a first predetermined value Vth1, e.g., 4.2 V, outputting a charge control signal to the charger 2; and a second control circuit 8 for outputting a discharge stop signal when at least one of the voltages V1 to V4 are less than a second predetermined value Vth2, e.g., 2.0 V, which is lower than the first predetermined value Vth1.

Further, the battery pack 1 includes signal terminals 13b, 13d for outputting the charge control signal and the discharge stop signal, respectively; a second power terminal 5c which is connected to a positive terminal of the battery assembly 4 and to which a charging current is supplied from the charger 2; a protection element 6 for opening/closing a flow path of the charging current supplied to the battery assembly 4 via the second power terminal 5c; and a third control circuit 9 for individually detecting voltages V1 to V4 across the secondary batteries 4A to 4D and, when at least one of the voltages V1 to V4 is greater than a third predetermined value Vth3, e.g., 4.5 V, which is higher than the first predetermined value Vth1, opening the flow path of the charging current by operating the protection element 6. Herein, lithium-ion batteries are used as the secondary batteries 4A to 4D.

The protection element 6 includes a so-called non-restorable fusing resistor in which an electric current flowing in a heater resistor 6a melts a fuse element 6b to open a flow path of the electric current. The signal terminals 13b, 13d are included in a plurality of, e.g., six in the drawing, signal terminals 13a to 13f provided in a signaling connector 13. Herein, the signal terminal 13a is connected to ground, the signal terminal 13c is connected to ground via a temperature measuring element (thermistor) Th for detecting a temperature of the battery assembly 4.

The signal terminal 13f is also connected to ground via an identifying resistor element Rx and the signal terminal 13e is connected to the second control circuit 8. The identifying resistor element Rx' is an element that has resistance depending on information relating to the battery assembly 4, e.g., the number, configuration, voltages, capacities or the like of the secondary batteries. The charger 2 and the electric power tool 3 can obtain the information relating to the battery assembly 4 by reading the resistance.

The first control circuit 7 includes a first detector 7a comparing the first predetermined value Vth1 with voltages V1 to V4 across respective secondary batteries detected by measuring electric potentials of positive electrodes of the secondary batteries 4A to 4D, and, when at least one of the voltages V1 to V4 exceeds the first predetermined value Vth1, outputting a high (H) level signal (i.e., an active high signal of an open-collector type output). The first control circuit 7 further includes a signal conversion circuit 7b converting the H level signal outputted from the first detector 7a into a charge control signal.

While the battery pack 1 is neither installed in the charger 2 nor the electric power tool (hereinafter, this state is referred to as "idle state"), the first detector 7a is powered from the battery assembly 4 and remains in a standby mode. For that reason, the first detector 7a is constituted by an integrated circuit (IC) in which an electric current consumption is extremely small, e.g., about 1 µA in the standby mode.

The signal conversion circuit 7b is supplied with power supply voltage VDD to operate while the battery pack 1 is installed in the charger 2 or the electric power tool. The signal conversion circuit 7b includes a switch element Q6 turned on/off based on a signal outputted from the first detector 7a, and a zener diode ZD6 connected to the power supply voltage VDD in parallel with the switch element Q6. When the signal outputted from the first detector 7a is low (L) level, the switch element Q6 turns off and an H level charge control signal (power supply voltage VDD) is outputted to the signal terminal 13b. Further, when the signal outputted from the first detector 7a is H level, the switch element Q6 turns on and an L level charge control signal is outputted to the signal terminal 13b.

In addition, the zener diode ZD6 is provided to protect the switch element Q6 from a noise and a reverse withstanding voltage.

The second control circuit 8 includes a second detector 8a, a signal conversion circuit 8b, a delay circuit 8c, a drive circuit 8d, and a power supply control circuit 8e. The second detector 8a detects voltages V1 to V4 across respective secondary batteries 4A to 4D by measuring electric potentials of the positive electrodes thereof and compares them with a second predetermined value Vth2, and, when at least one of the voltages V1 to V4 is less than the second predetermined value Vth2, outputs an L level signal (i.e., an active low signal of an open-collector type output).

The signal conversion circuit 8b converts the L level signal outputted from the second detector 8a into a discharge stop signal. The signal conversion circuit 8b includes a switch element Q5 turned on/off based on a signal outputted from the second detector 8a and a zener diode ZD5 connected to the power supply voltage VDD in parallel with the switch element Q5. Further, the signal conversion circuit 8b is powered from the power, supply voltage VDD while the battery pack 1 is installed in the charger 2 or the electric power tool 3. Accordingly, when the signal outputted from second detector 8a is H level, the switch element Q5 turns on and an L level discharging stop signal is outputted to the signal terminal 13d and, when the signal outputted from the second detector 8a is L level, the switch element Q5 turns off and an H level discharging stop signal (power supply voltage VDD) is outputted to the signal terminal 13d.

Further, the zener diode ZD5 is provided to protect the switch element Q5 from a noise and reverse withstanding voltage. The delay circuit 8c operates as an integral circuit by including a resistor R18 and a condenser C9 and lengthens a rising time period in the signal outputted from the second detector 8a. The power supply control circuit 8e also controls electric power supply from the battery assembly 4 to the second detector 8a. Furthermore, the drive circuit 8d drives the power supply control circuit 8e in response to a control signal inputted from the charger 2 or the electric power tool while the battery pack 1 is installed in the charger 2 or the electric power tool 3.

The third control circuit 9 includes a third detector 9a outputting an H level signal (an active high signal of a CMOS output) when at least one of the voltages V1 to V4 exceeds a third predetermined value Vth3, and a protection element drive circuit 9b for melting and disconnecting a fuse element 6b by making an electric current flown through a heater resistor 6a of the protection element 6 when the H level signal is outputted from the third detector 9a.

More specifically, the third detector 9a detects voltages V1 to V4 across, respective secondary batteries 4A to 4D by measuring electric potentials at positive terminal of the secondary batteries 4A to 4D and compares the detected voltages V1 to V4 with the third predetermined value Vth3. Similar to the first detector 7a, the third detector 9a is also powered from the battery assembly 4 and remains in the standby mode during the idle state. Hence, the third detector 9a is constituted by an IC consuming an extremely small electric current, e.g., about 1 µA in the standby mode.

The protection element drive circuit 9b includes a resistor R26 and a switch element Q7. When the H level signal is outputted from the third detector 9a, the switch element Q7 turns on and an electric current flows in the heater resistor 6a of the protection element 6.

In the battery pack 1, ground of the signal terminal 13a is separated from ground of the power terminal 5b connected to a negative terminal of the battery assembly 4. Accordingly, it is possible to prevent an excessive discharging or charging current from flowing even if there is a connection error between power terminals 17a, 17b of the charger 2 or the electric power tool and the power terminals 5a, 5b and the second power terminal 5c.

Meanwhile, the charger 2 includes a signaling connector 14 detachably connected to the signaling connector of the battery pack 1, and power terminals 7b and 7a detachably connected to the power terminal 5b and the second power terminal 5c of the battery pack 1, respectively. The charger 2 further includes a power supply circuit 21 for converting an alternative current (AC) electric power into a direct current (DC) electric power and outputting it to the power terminals 17a and 17b, and a charge control circuit 19 controlling a charge by adjusting an output of the power supply circuit 21.

The signaling connector 14 has signal terminals 14a to 14f connected to the signal terminals 13a to 13f of the signaling connector 13 of the battery pack 1, respectively. Further, the signal terminal 14a is connected to ground and the signal terminals 14d and 14f are pulled up via resistors 28 and 29 to power supply voltage VDD of the charge control circuit 19.

Next, a charging operation will be explained when the battery pack 1 is installed in the charger 2. When the battery pack 1 is installed in the charger 2, the second power terminal 5c, the power terminal 5b, and the signaling connector 13 are connected to the power terminals 17a and 17b, and the signaling connector 14, respectively. Accordingly, voltages of the signal terminals 14c and 14f change from the power supply voltage VDD into a voltage voltage-dividing the power supply voltage VDD by the pull-up resistor 28 and 29, the temperature measurement element (thermistor) Th, and the identifying, resistor element Rx. The charge control circuit 19 automatically detects installation of the battery pack 1 by detecting changes in the voltages of the signal terminals 14c, 14f and starts to charge.

Upon starting to charge, the charge control circuit 19 applies a control signal VD to the signal terminal 14e to operate the second control circuit 8. At the same time, the charge control circuit 19 reads information relating to the battery pack 1 from the voltage of the signal terminal 14f and also reads from the signal terminal 14c temperature of the battery assembly 4 detected by using the temperature measurement element Th. When the temperature of the battery assembly 4 is within a certain range and a charge control signal inputted to the signal terminal 14b is H level (voltages across every secondary batteries 4A to 4D is below the first predetermined value Vth1), the charge control circuit 19 operates the power supply circuit 21 to supply an electric current in a charging current path of the battery pack 1 (i.e., second power terminal 5c→protection element 6→battery assembly 4→power terminal 5b), thereby charging the battery assembly 4.

When one of the voltages across the secondary batteries 4A to 4D exceeds the first predetermined value Vth1 and a charge control signal inputted to the signal terminal 14b becomes L level, the charge control circuit 19 controls the power supply circuit 21 to reduce the charging current and makes transition to constant-voltage charge. The charge control circuit 19 reduces the charging current step by step whenever the charge control signal changes the H level to the L level. When the charging current goes below a threshold value, the charge control circuit 19 completes charging by stopping the power supply circuit 21 and stops application of the control signal VD to the signal terminal 14e. Accordingly; the second control circuit 8 stops, thereby suppressing an electric current consumption in the battery pack 1.

When the battery pack 1 is removed from the charger 2, the voltages of the signal terminals 14c, 14f increase to the power supply voltage VDD, which is detected by the charge control circuit 19. Since the signal terminals 14c, 14f of the signaling connector 14 are pulled up via the resistors R28, R29 to the power supply voltage VDD in the charger 2, removing the battery pack 1 can be detected only by stopping application of the control signal VD to the signal terminal 14e. Further, if a pull-up resistor is provided in the battery pack 1, the control signal VD needs to be applied as long as a voltage is not applied to a signal terminal which is additionally provided.

In the above conventional example, four kinds of safety functions operate upon charging. Firstly, when at least one of the voltages across the secondary batteries 4A to 4D exceeds the first predetermined value Vth1 in the first control circuit 7, as described above, the first control circuit 7 informs the charge control circuit 19 of the charger 2 of the voltage excess by changing the charge control signal from H level to L level. Accordingly, the charge control circuit 19 controls the power supply circuit 21 to reduce the charging current.

Secondly, temperatures of the secondary batteries 4A to 4D are detected by using the temperature measurement element Th and, when the detected temperatures exceed a certain value (70° C.), the charge control circuit 19 stops charging. Thirdly, the charge control circuit 19 monitors voltage of the second power terminal 5c and, when the voltage exceeds a certain value (17.5 V), stops charging. Fourthly, when at least one of the voltages across the secondary batteries 4A to 4D exceeds the third predetermined value (4.5 V), the third control circuit 9 operates the protection element 6 to disconnect (melt) a charging current path.

As another conventional example, there is disclosed a battery pack in Japanese Patent Application Publication H10-12283. The battery pack in accordance with the above another conventional example detects temperatures of a group of batteries (battery assembly) by using temperature sensors. Such a battery pack determines an internal voltage of each battery based on each battery voltage measured by a voltage measurement circuit, a charging/discharging current measured by a current measurement circuit, and the temperatures detected by the temperature sensors. The battery pack further detects a residual capacity of the group of batteries based on each internal voltage.

If a lithium-ion battery is used as a secondary battery of the battery pack, the higher a charging voltage is, the larger a charging capacity but the worse a life span or safety of the battery is. Reversely, if the charging voltage is lowered, the capacity becomes smaller but the life span or safety is better. Further, the lithium-ion battery has an upper limit in the charging voltage depending on the temperature (battery temperature). If temperature of the battery is not within a proper range, it adversely influences on the life span thereof. Particularly, when the battery temperature exceeds a proper range, there occurs a problem that the life span of the battery becomes drastically shorter unless the upper limit of the charging voltage is lowered.

Therefore, in order to prevent the life span of the battery from reducing while the capacity remains as much as possible, it is, needed to adjust the charging voltage to a proper level depending on the battery temperature. In this regard, the charger 2 stops charging when the temperatures of the secondary batteries detected by the temperature measurement element exceed a threshold value in the former conventional example. In the latter, the internal voltages of the batteries are corrected based on the temperatures of the batteries. Not in both cases, it was to adjust the charging voltage based on the temperature of the battery.

SUMMARY OF THE INVENTION

In view of the above, the present invention provides a battery pack capable of preventing a life span of the secondary battery from reducing while a capacity thereof remains as much as possible.

In accordance with an aspect of the present invention, there is provided a battery pack which is detachably connected to a charger and charged by connecting thereto, including: a battery assembly including a plurality of secondary batteries serially connected; a pair of power terminals connected to a negative and a positive electrode of the battery assembly, respectively; a control circuit adapted to individually detect voltages across respective secondary batteries and output a charge control signal to the charger when the detected voltages exceed a predetermined value; a signal terminal adapted to output the charge control signal to the charger; and a temperature measurement element for detecting a temperature of the battery assembly. In the battery pack, the control circuit changes the predetermined value to be compared with the detected voltages based on the detected temperature of the temperature measurement element.

With the above configuration, since the control circuit changes the predetermined value to be compared with the detected voltages depending on the temperature detected by the temperature measurement element, a charging voltage can be adjusted based on the battery temperatures, thereby preventing a life span of the battery from reducing while a capacity thereof remains as much as possible.

The control circuit may include a first detection circuit adapted to individually detect voltages across respective secondary batteries and output a charge control signal when the detected voltages exceed a first predetermined value; a second detection circuit adapted, to individually detect voltages across respective secondary batteries and output a charge control signal when the detected voltages exceed a second predetermined value which is different from the first predetermined value; and a selection circuit adapted to selectively, output the charge control signal outputted from the first detection circuit and the charge control signal outputted from the second detection circuit to the charger depending on a result of comparison.

Further, the temperature measurement element may include a thermistor having resistance changing depending on temperature, and be connected between a pair of temperature measurement signal terminals coupled to the charger. Further, one of the temperature measurement signal terminals may be connected to ground for signal, ground of the control circuit may be connected to ground of the battery assembly, and the ground for signal and the ground of the battery assembly may be separately provided. Furthermore, the control circuit may include an insulation circuit and the temperature measurement signal terminals may be connected to the selection circuit via an insulation circuit.

With this configuration, when the charging current is supplied, a voltage drop caused by contact resistance at power terminals does not influence on the temperature detected by the temperature measurement element, thereby improving accuracy in the detected temperature of the temperature measurement element. Further, the charger can operate the temperature measurement element to measure a temperature and, accordingly, there is no need to provide a temperature measurement element at a side of the charger.

The insulation circuit may include a resistor bridge circuit having the temperature measurement element, and a comparator for comparing a reference value with a resistance of the temperature measurement element measured by the resistor bridge circuit.

The control circuit further may include a plurality of diodes, each having an anode connected the ground of the battery assembly and a cathode connected to the temperature measurement signal terminal.

With this configuration, even if a connection error occurs in the power terminals connected to the negative electrode side of the battery assembly, it is possible to prevent a reverse voltage from being applied to the control circuit through the temperature measurement signal terminals.

EFFECTS OF THE INVENTION

With the present invention, it is possible to prevent a life span of the battery from reducing while a capacity thereof remains as much as possible.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with reference to accompanying drawings which form a part hereof.

Figure 6:
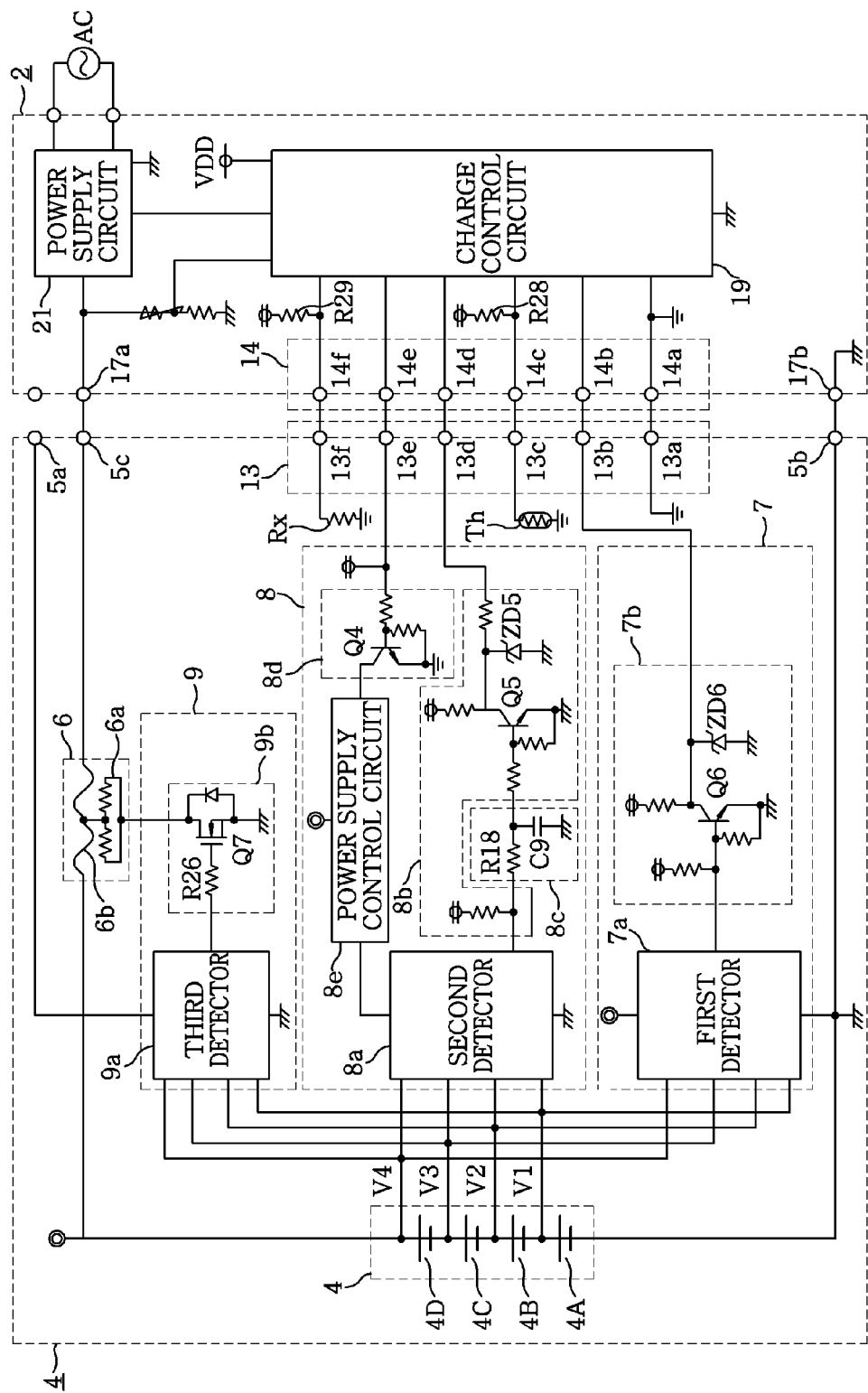
FIG. 6 shows a circuit diagram of a battery pack in accordance with a conventional example.

A battery pack in accordance with the present embodiment differs from the conventional example in that a first control circuit 7 (hereinafter, referred to as 'control circuit') provided in the battery pack 1 has a configuration differing from that of the conventional example. The other components are same as that of the conventional example shown in FIG. 6. Therefore, the same components will be designated by like reference characters and illustration and description thereof will be omitted.

As described in the conventional example, the control circuit 7 includes a first detector 7a for detecting voltages V1 to V4 across respective secondary batteries 4A to 4D by determining electric potentials of positive electrodes of four secondary batteries 4A to 4D, comparing the detected voltages V1 to V4 with a first predetermined value Vth1, and outputting an H level signal when at least one of the detected voltages exceeds the first predetermined value, and a signal conversion circuit 7b for converting the H level signal outputted from the first detector 7a into a charge control signal. The charge control signal converted by the signal conversion circuit 7b is inputted to a charge control circuit 19 of a charger 2 via a signal terminal 13b of the battery pack 1 and a signal terminal 14b of the charger 2.

Figure 4:
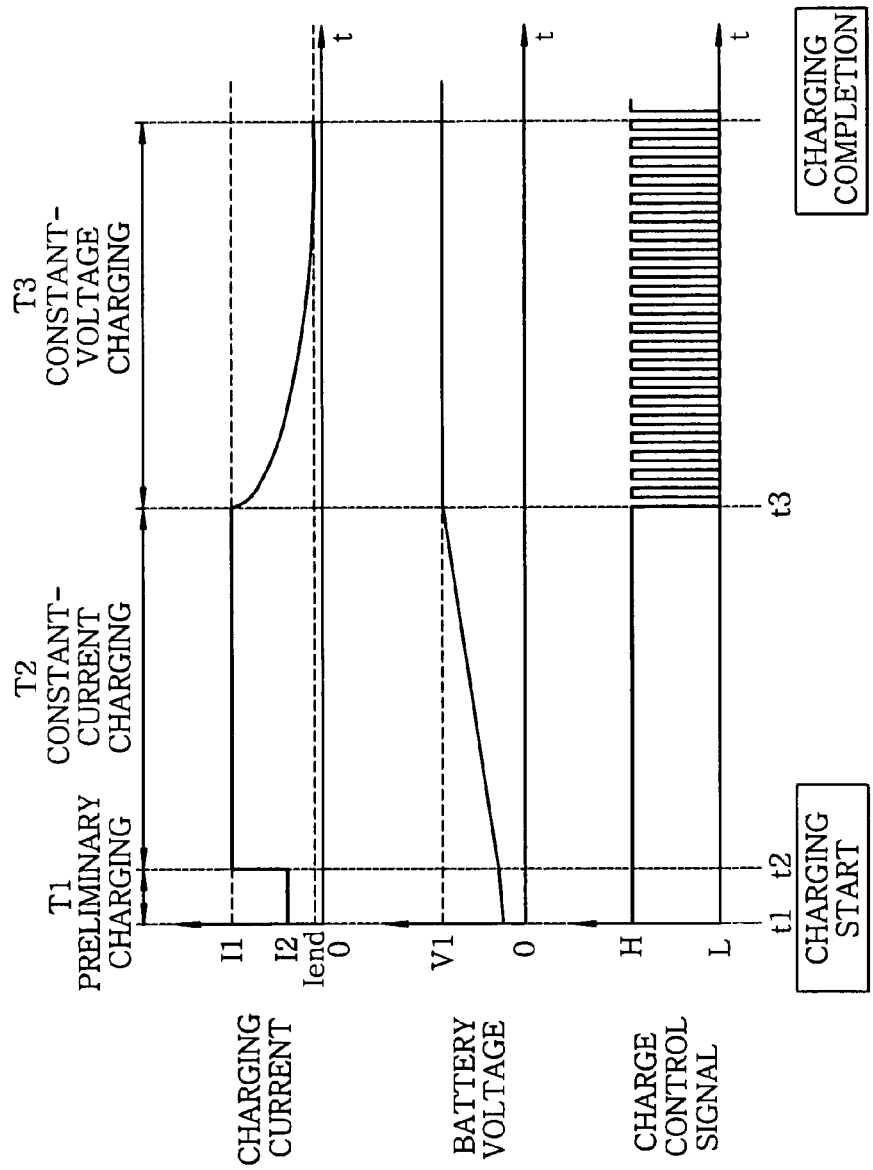
FIG. 4 presents a time chart (c) for explaining a charging operation.

FIG. 4 depicts charging characteristic curves of an entire charging process which is carried out by the charge control circuit 19. At time point t1, the battery pack 1 is installed in the charger 2 and is preliminary charged at a charging current I2 smaller than a normal charging current I1 for a time period T1 (i.e., time point t1 to t2). From time point t2 after a lapse of time period T1, the battery pack 1 is charged at a constant current I1. During the constant-current charging, an H level charge control signal is outputted from the control circuit 7 of the battery pack 1 to the charge control circuit 19 via the signal terminals 13b, 14b.

When the voltages across respective secondary batteries 4A to 4D arrive at the first predetermined value Vth1 after a lapse of time period T2, the charge control signal outputted from the first control circuit 7 changes from H level to L level. At time point t3, the charge control circuit 19 receives the L level charge control signal and makes transition to a constant-voltage charging. After transition to the constant-voltage charging, the charge control circuit 19 performs a multi-steps constant-current charging in which a charging current decreases by a predetermined decrement ΔI1 whenever the charge control signal changes from the L level to the H level. Accordingly, the charging current can be controlled while the charging voltage remains at the first predetermined value Vth1.

When the charging current is lowered down to a predetermined current value Iend, e.g., a time period T3 is elapsed, the charging is completed.

Figure 1:
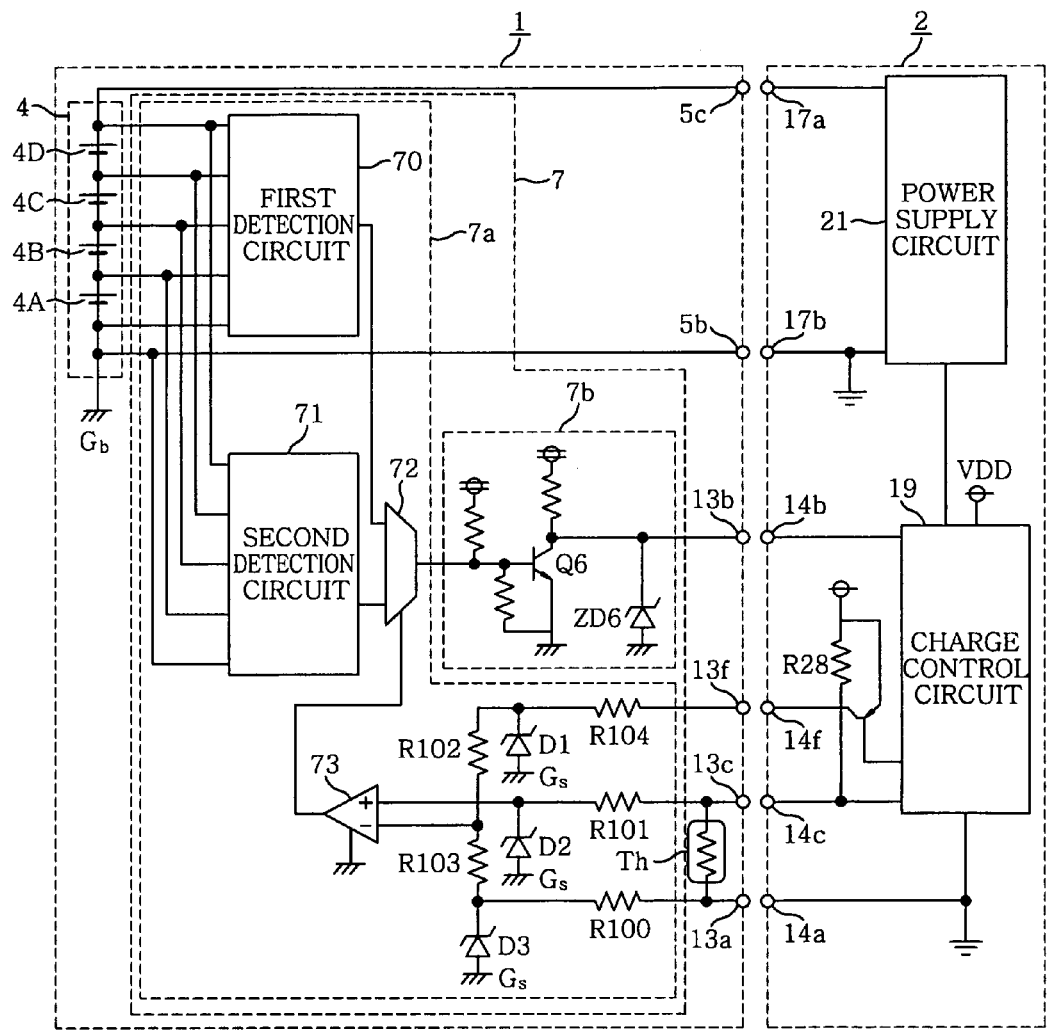
FIG. 1 shows a circuit diagram of a battery pack in accordance with an embodiment of the present invention.

As shown in FIG. 1, the first detector 7a includes a first detection circuit 70 for individually detecting voltages across respective secondary batteries 4A to 4D and outputting an H level charge control signal when the detected voltage exceeds the first predetermined value Vth1, and a second detection circuit 71 for individually detecting voltages across the secondary batteries 4A to 4D and outputting an H level charge control signal when the detected voltage exceeds a second predetermined value Vth1' (<Vth1) differing from the first predetermined value Vth1. The first detector 7a further includes a selection circuit 72 (multiplexer) which selectively outputs the charge control signal outputted from the first detection circuit 70 and the charge control signal outputted from the second detection circuit 71 to the charger 2, based on temperature detected by a temperature measurement element Th.

Meanwhile, the temperature measurement element Th is constituted by a negative thermistor in which resistance decreases with rising of temperature, and connected between a pair of signal terminals 13a and 13c (hereinafter, referred to as 'temperature measurement signal terminals') coupled to the charger 2. Further, the temperature measurement signal terminal 13a is connected to ground Gs for signal via a zener diode D3, ground for the first control circuit 7 is connected to ground Gb of a battery assembly 4, and the ground Gs for signal and the ground Gb of the battery assembly 4 are separately provided. Besides, the temperature measurement signal terminals 13a and 13c are connected to the selector 72 via an insulation circuit (resistor bridge circuit and comparator 73).

The resistor bridge circuit is of Kelvin Double type including five resistors R100 to R104 and a temperature measurement element Th. One end of the resistor R100 is connected to a connection point between the temperature measurement signal terminal 13a and one end of the temperature measurement element Th, and the other end is connected to a connection point between the cathode of the zener diode D3 and one end of the resistor R103. The other end of the resistor R103 is connected to a connection point between a negative terminal of the comparator 73 and one end of the resistor R102. The other end of the resistor R102 is connected to one end of the resistor R104 and the other end of the resistor R104 is connected to a signal terminal 13f. One end of the resistor R101 is connected to a positive terminal of the comparator 73 and the other end is connected to a connection point of the temperature measurement signal terminal 13c and the other end of the temperature measure element Th.

Further, there is provided a zener diode D1 whose anode is connected to the ground Gs between a connection point of the resistors R102 and R104 and the ground Gs for signal. Similarly, a zener diode D2 is connected between the positive terminal of the comparator 73 and the ground Gs for signal, an anode of the zener diode D2 being connected to the ground Gs. Thus, it is possible to prevent a static electricity applied to the terminals 13a, 13c, 13f from being applied to the input terminals of the comparator 73 by using the three zener diodes D1 to D3.

The comparator 73 compares a reference voltage Vref with a voltage proportional to a voltage drop in the temperature measurement element Th (a voltage corresponding to the detected temperature) and switches a selection of the selection circuit 72 based on a result of the comparison. That is, when an output signal of the comparator 73 is H level, the selection circuit 72 selects and outputs the charge control signal outputted from the first detection circuit 70. On the other hand, when the output signal of the comparator 73 is L level, the selection circuit 72 selects and outputs the charge control signal which the second detection circuit 71 outputs. Further, the reference voltage Vref inputted to the negative terminal of the comparator 73 corresponds to a voltage across the resistors R103 and R100, among the power supply voltage VDD supplied from the charger proportionally distributed to the resistors R104, R102, R103, R100.

Figure 2:
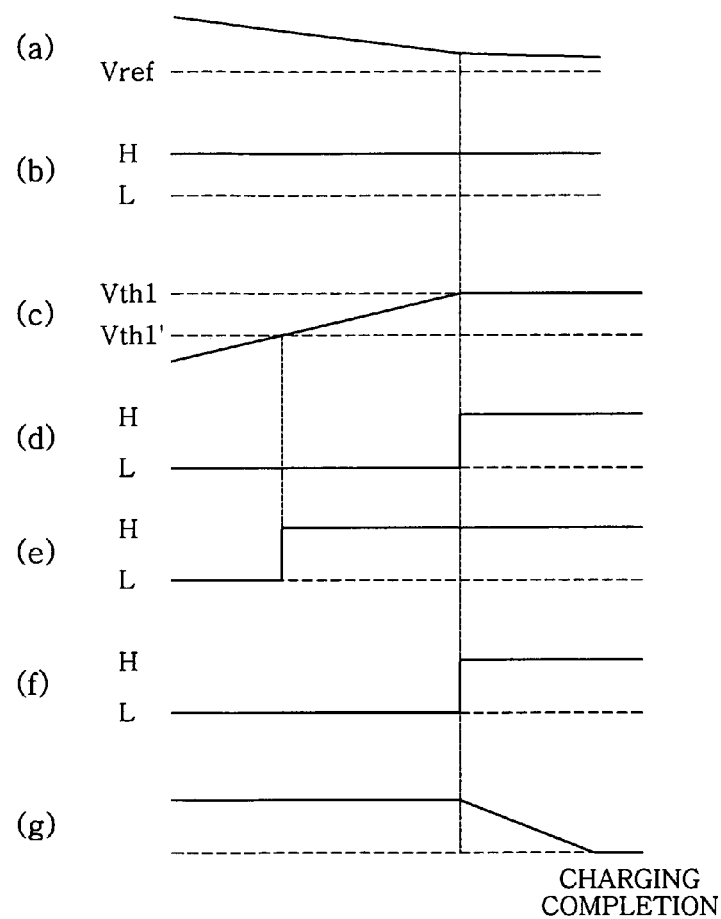
FIG. 2 depicts a time chart (a) for explaining an operation of the battery pack.
Figure 3:
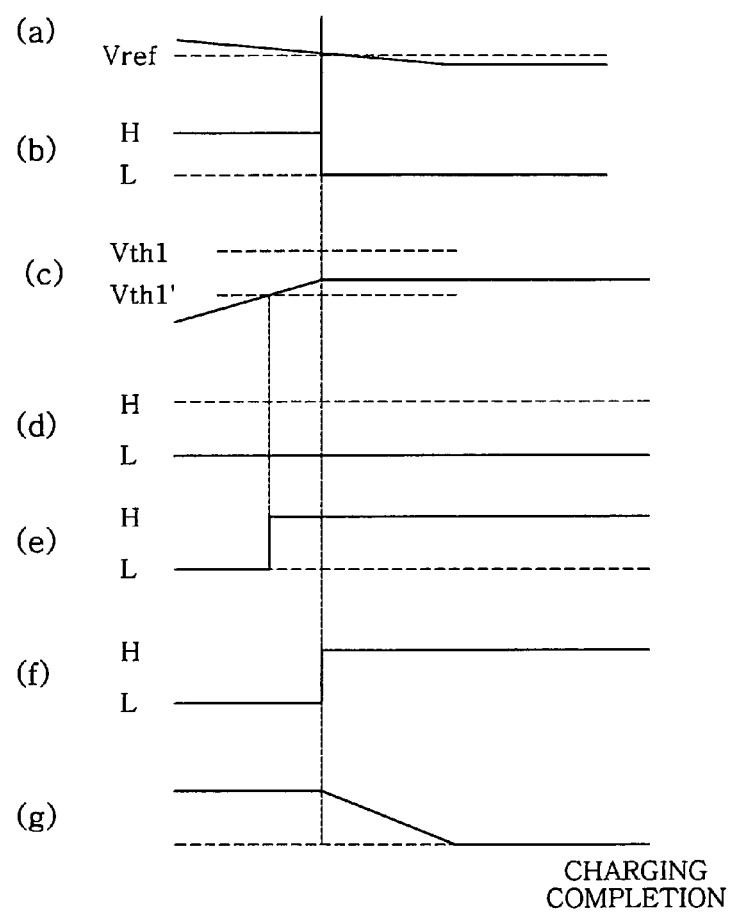
FIG. 3 illustrates a time chart (b) for explaining an operation of the battery pack.

Next, operation upon charging of the battery pack in accordance with the present embodiment with reference to FIGS. 2 and 3 will be described. FIGS. 2 and 3 present (a) a voltage inputted to the positive terminal of the comparator (a voltage proportional to a voltage drop in the temperature measurement element Th), (b) an output of the comparator 73, (c) voltages across each of the secondary batteries 4A to 4D, (d) an output of the first detection circuit 70, (e) an output of the second detection circuit 71, (f) an output of the selection circuit 72, and (g) an charging current supplied to the battery pack 1 from the charger 2.

First of all, there will be described a case in which a temperature (battery temperature) of the battery assembly 4 is relatively low, with reference to the time chart shown in FIG. 2.

During charging, the battery temperature gradually rises and, accordingly, resistance of the temperature measurement element Th decreases. However, if the battery temperature is not high much, e.g., an ambient temperature is room temperature or sufficiently low, the voltage inputted to the positive terminal of the comparator 73 do not descend below the reference voltage Vref (see (a) in FIG. 2) and the output of the comparator 73 remains H level (see (b) in FIG. 2). Hence, the selection circuit 72 selects a signal outputted from the first detection circuit 70 and outputs it to the signal conversion circuit 7b (see (d) and (f) in FIG. 2).

Herein, the first detection circuit 70 outputs L level signal until the voltages across respective secondary batteries 4A to 4D reach the first predetermined value Vth1 and, when the voltages across respective secondary batteries 4A to 4D arrives at the first predetermined value Vth1, outputs H level signal (see (c) and (d) in FIG. 2). That is, H level charge control signal is outputted until the voltages across respective secondary batteries 4A to 4D reach the first predetermined value Vth1 and the charge control circuit 19 of the charger 2 carries out a constant-current charging (see (g) in FIG. 2). Further, the first detection circuit 70 outputs H level signal (see (d) in FIG. 2) when the voltages across respective secondary batteries 4A to 4D reach the first predetermined value Vth1 and, accordingly, the charge control signal outputted from the control circuit 7 changes from H level to L level.

The charge control circuit 19 receives L level charge control signal and makes transition from the constant-current charging to a constant-voltage charging. Thereafter, the charge control circuit 19 completes the charging by performing multi-steps constant-current charging (see (g) in FIG. 2).

Next, description will be made on a case in which the battery temperature is relatively high with reference to the time chart shown in FIG. 3.

When the ambient temperature is sufficiently higher than the room temperature, the battery temperature gradually increases during charging. Then, the voltage inputted to the positive terminal of the comparator 73 descends below the reference voltage Vref (see (a) in FIG. 3), and the output thereof changes from H level to L level (see (b) in FIG. 3). Accordingly, the selection circuit 72 selects the signal outputted from the first detection circuit 70 while the output signal of the comparator 73 is H level but, when the output signal of the comparator 73 becomes L level, selects the signal outputted from the second detection circuit 71 and outputs it to the signal conversion circuit 7b (see (d)-(f) in FIG. 3).

That is, the second detection circuit 71 outputs L level signal until the voltages across respective secondary batteries 4A to 4D reaches the second predetermined value Vth1' and, when the voltages across respective secondary batteries 4A to 4D exceeds the second predetermined value Vth1', outputs H level signal (see (e) in FIG. 3). Accordingly, the H level charge control signal is outputted until the voltages across respective secondary batteries 4A to 4D reaches the second predetermined value Vth1' and the charge control circuit 19 of the charger 2 performs the constant-current charging (see (g) in FIG. 3).

Further, when the voltages across the secondary batteries 4A to 4D exceed the second predetermined value Vth1', the output of the second detection circuit 71 becomes H level (see (e) in FIG. 3). In this state, when the output of the comparator 73 changes from H level to L level (see (b) in FIG. 3), the charge control signal outputted from the control circuit 7 becomes L level. Accordingly, the charge control circuit 19 makes transition from the constant-current charging to the constant-voltage charging. Thereafter, the charge control circuit 19 performs the multi-steps constant-current charging to complete the charging (see (g) in FIG. 3).

As describe above, when the battery temperature is relatively high, a voltage (charging voltage) at which the charge control circuit 19 of the charger 2 changes from the constant-current charging to the constant-voltage charging is low compared to a case in which the battery temperature is relatively low. Therefore, reduction of a life span caused by overcharging can be prevented. Furthermore, a control is made which makes the charging voltage higher when the battery temperature is relatively low. Therefore, it is possible to increase a capacity of the secondary batteries 4A to 4D compared to a case in which the battery temperature is high.

In accordance with the embodiment of the present embodiment, since the control circuit 7 changes a predetermined value to be compared with voltages detected from the secondary batteries 4A to 4D, based on the temperature detected by the temperature measurement element Th, the charging voltage can be adjusted depending on the battery temperature. As a result, it is possible to prevent the life span of the battery from reducing while a capacity of the secondary batteries 4A to 4D remains as much as possible.

In the present invention, the control circuit 7 does not directly obtain a voltage drop in the temperature measurement element Th but obtains it from the comparator 73 by using a resistor bridge circuit and a comparator 73. Therefore, a voltage drop caused by contact resistance of the power terminals (i.e., signal terminals 13c and 13f) to which the charging current is supplied does not affect the detected temperature of the temperature measurement element Th, thereby improving accuracy in temperature detection of the temperature measurement element Th. Further, it is possible to detect a temperature by using the temperature measurement element Th via the temperature measurement signal terminals 14a and 14c even at a side of the charger 2 and, accordingly, eliminates a need for a temperature measurement element to be provided in the charger 2.

Meanwhile, if the power terminals 5b and 17b at a negative side (ground side) become open due to a connection error or the like, there may occur an electric, potential difference between the ground of the charger 2 and the ground Gb of the battery assembly 4. The electric potential difference corresponds to a difference between a maximum output voltage of the power supply circuit 21 of the charger 2 and the battery voltages of the battery assembly 4, which may cause a reverse voltage to apply to the first detector 7a via the temperature measurement element Th.

However, in accordance with the present embodiment, since the zener diodes D2 and D3 are provided between both ends of the temperature measure element Th and the ground Gs for signal, the above-mentioned reverse voltage can be prevented from being applied to the first detector 7a.

Figure 5:
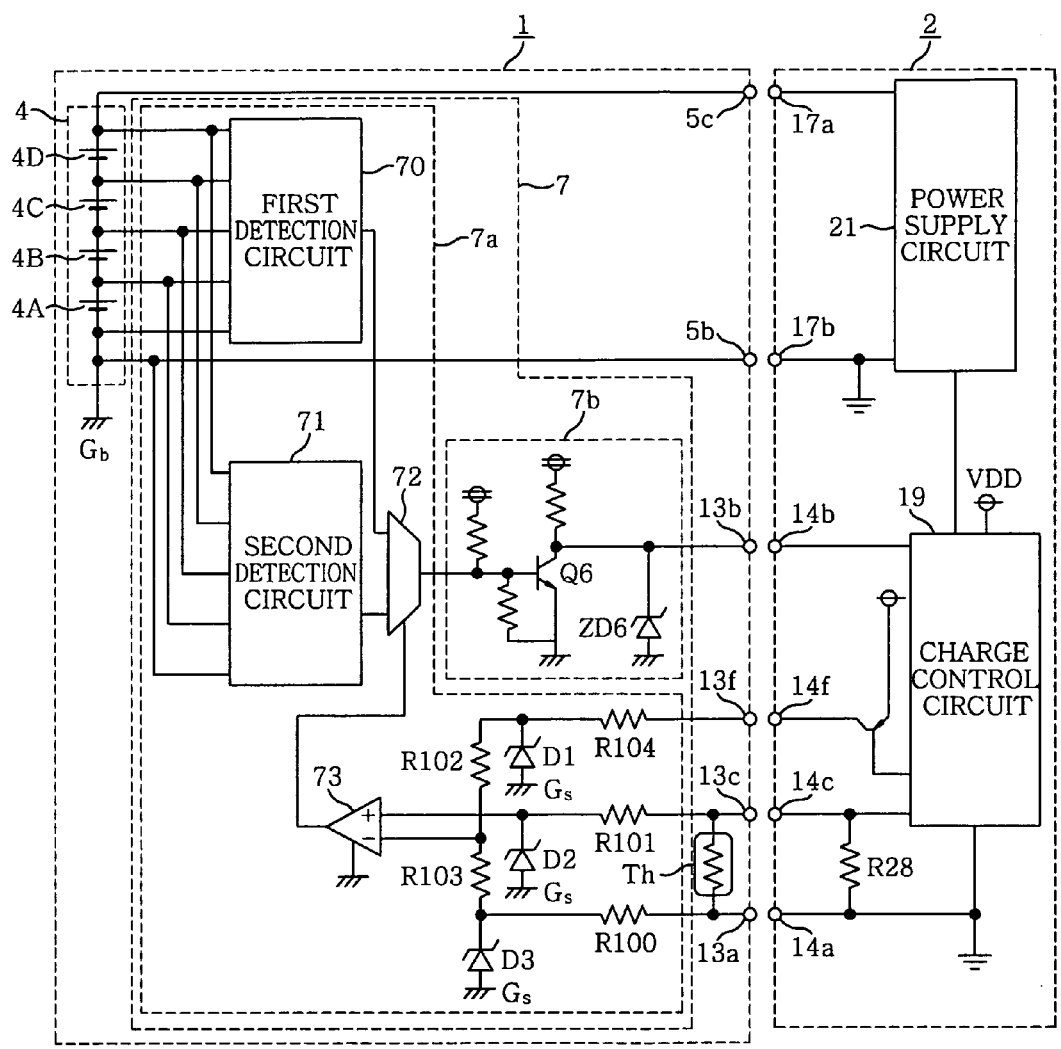
FIG. 5 represents a circuit diagram of a battery pack in accordance with another embodiment of the present invention.

Alternatively, the temperature measurement element Th may be provided between the signal terminals 13f and 13c and the resistor R28 may be provided between the signal terminals 14a and 14c in the charger 2, as shown in FIG. 5.

While the invention has been shown and described with respect to the embodiments, it will be understood by those skilled in the art that various changes and modifications may be made without departing from the scope of the invention as defined in the following claims.

What is claimed is:

1. A battery pack which is detachably connected to a charger and charged by connecting thereto, comprising:
    a battery assembly including a plurality of secondary batteries serially connected;
    a pair of power terminals connected to a negative and a positive electrode of the battery assembly, respectively;
    a control circuit adapted to individually detect voltages across respective secondary batteries and output a charge control signal to the charger when the detected voltages exceed a predetermined value;
    a signal terminal adapted to output the charge control signal to the charger; and
    a temperature measurement element for detecting a temperature of the battery assembly,
    wherein the control circuit is configured to select, as the predetermined value, one of two or more values based on the detected temperature of the temperature measurement element.

2. The battery pack of claim 1, wherein the control circuit includes a first detection circuit adapted to individually detect voltages across respective secondary batteries and output a charge control signal when the detected voltages exceed a first predetermined value; a second detection circuit adapted to individually detect voltages across respective secondary batteries and output a charge control signal when the detected voltages exceed a second predetermined value which is different from the first predetermined value; and a selection circuit adapted to selectively output the charge control signal outputted from the first detection circuit and the charge control signal outputted from the second detection circuit to the charger depending on the detected temperature of the temperature measurement element.

3. The battery pack of claim 2, wherein the temperature measurement element includes a thermistor having a resistance changing depending on temperature, and is connected between a pair of temperature measurement signal terminals coupled to the charger;
    one of the temperature measurement signal terminals is connected to ground for signal, ground of the control circuit is connected to ground of the battery assembly, and the ground for signal and the ground of the battery assembly are separately provided; and
    the control circuit further includes an insulation circuit and the temperature measurement signal terminals are connected to the selection circuit via the insulation circuit.

4. The battery pack of claim 3, wherein the insulation circuit includes a resistor bridge circuit having the temperature measurement element, and a comparator for comparing a reference value with a voltage corresponding to the detected temperature of the temperature measurement element.

5. The battery pack of claim 3, wherein the control circuit further includes a plurality of diodes, each having an anode connected to the ground for signal and a cathode connected to one of the temperature measurement signal terminals.

6. The battery pack of claim 4, wherein the control circuit further includes a plurality of diodes, each having an anode connected to the ground for signal and a cathode connected to one of the temperature measurement signal terminals.

* * * * *